(12) United States Patent
Giterman et al.

(10) Patent No.: US 11,916,938 B2
(45) Date of Patent: Feb. 27, 2024

(54) ANOMALY DETECTION AND REMEDIATION UTILIZING ANALYSIS OF STORAGE AREA NETWORK ACCESS PATTERNS

(71) Applicant: EMC IP Holding Company LLC, Hopkinton, MA (US)

(72) Inventors: Boris Giterman, Beer Sheva (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 524 days.

(21) Appl. No.: 17/006,070

(22) Filed: Aug. 28, 2020

(65) Prior Publication Data

US 2022/0070190 A1 Mar. 3, 2022

(51) Int. Cl.
*H04L 9/40* (2022.01)
*G06N 20/00* (2019.01)
*G06F 13/42* (2006.01)

(52) U.S. Cl.
CPC ...... *H04L 63/1425* (2013.01); *G06F 13/4221* (2013.01); *G06N 20/00* (2019.01); *G06F 2213/0036* (2013.01)

(58) Field of Classification Search
CPC . H04L 63/1425; G06N 20/00; G06F 13/4221; G06F 2213/0036
See application file for complete search history.

(56) References Cited

U.S. PATENT DOCUMENTS 6,567,397 B1 5/2003 Campana et al.
6,687,746 B1 2/2004 Shuster et al.
(Continued)

FOREIGN PATENT DOCUMENTS

CN 103677927 B 2/2017
EP 1117028 A2 7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Lynn D Feild
*Assistant Examiner* — Saad Ahmad Abdullah
(74) *Attorney, Agent, or Firm* — Ryan, Mason & Lewis, LLP

(57) ABSTRACT

An apparatus comprises at least one processing device that includes a processor and a memory coupled to the processor. The at least one processing device is configured to receive storage access protocol commands directed by one or more host devices to storage devices of a storage system over a storage area network, to generate statistics relating to the received storage access protocol commands, to process the generated statistics in a machine learning system trained to recognize anomalous access patterns to the storage devices over the storage area network, and to generate an alert indicative of an access anomaly based at least in part on the processing of the generated statistics in the machine learning system. A multi-path input-output (MPIO) driver of the one or more host devices may be provided with the alert and configured to initiate one or more remediation actions responsive to the alert.

17 Claims, 4 Drawing Sheets

321 — PROTOCOL-LEVEL STATISTICS MAINTAINED FOR STORAGE DEVICES 106

| STORAGE DEVICE 1 | STATISTICS DERIVED FROM PER-COMMAND RECORDS |
| STORAGE DEVICE 2 | STATISTICS DERIVED FROM PER-COMMAND RECORDS |
| ⋮ | ⋮ |
| STORAGE DEVICE M | STATISTICS DERIVED FROM PER-COMMAND RECORDS |

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,430,436 B1 * | 8/2016 | Venkataraman .... H04L 43/0811 |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,055,582 B1 | 8/2018 | Weaver et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,593,380 B1 * | 3/2020 | Volpe ..................... G06F 17/18 |
| 10,606,496 B1 | 3/2020 | Mallick et al. |
| 10,609,066 B1 | 3/2020 | Nossik et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0181642 A1 * | 9/2004 | Watanabe ............... G06F 3/065 |
| | | 711/162 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2017/0315801 A1 * | 11/2017 | Fullbright ................. G06F 8/20 |
| 2018/0041529 A1 * | 2/2018 | Mixer ................. H04L 63/0245 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0163371 A1 * | 5/2019 | Nambiar ................. G06F 3/065 |
| 2019/0334987 A1 | 10/2019 | Mallick et al. |
| 2020/0021653 A1 | 1/2020 | Rao et al. |
| 2020/0042707 A1 | 2/2020 | Kucherov et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 * | 6/2020 | Mallick ................... G06F 3/061 |
| 2020/0213274 A1 | 7/2020 | Pusalkar et al. |
| 2020/0241890 A1 | 7/2020 | Mallick et al. |
| 2020/0371700 A1 * | 11/2020 | Stabrawa .............. G06F 3/0631 |
| 2021/0281591 A1 * | 9/2021 | Furtak ................. H04L 63/1425 |
| 2021/0390179 A1 * | 12/2021 | Hahn .................... G06F 21/602 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

Vmware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

* cited by examiner

321

| PROTOCOL-LEVEL STATISTICS MAINTAINED FOR STORAGE DEVICES 106 | |
|---|---|
| STORAGE DEVICE 1 | STATISTICS DERIVED FROM PER-COMMAND RECORDS |
| STORAGE DEVICE 2 | STATISTICS DERIVED FROM PER-COMMAND RECORDS |
| ... | ... |
| STORAGE DEVICE M | STATISTICS DERIVED FROM PER-COMMAND RECORDS |

FIG. 4

ANOMALY DETECTION AND REMEDIATION UTILIZING ANALYSIS OF STORAGE AREA NETWORK ACCESS PATTERNS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols.

An information processing system comprising one or more storage systems of the type noted above is generally configured to incorporate various forms of security functionality in order to protect the computers, servers, storage devices and other processing devices of the system against malicious activity. Such malicious activity can include, for example, ransomware attacks in which malware infecting one or more processing devices of the system will systematically encrypt files on an associated storage array or other type of storage system. The attacker withholds the corresponding decryption key unless a ransom is paid by the victim. Conventional techniques for combating ransomware attacks and other types of cyber-attacks can be problematic in that such techniques can take an unduly long amount of time to detect an attack in progress. The longer it takes to detect the attack, the greater the number of files that are encrypted or otherwise compromised, and the greater the adverse impact of the attack on the victim.

A need therefore exists for improved techniques for detection and remediation of active cyber-attacks such as the above-described ransomware attacks or other types of malicious activity targeting stored data of a storage array or other type of storage system.

SUMMARY

Illustrative embodiments provide techniques for automated anomaly detection and remediation based at least in part on analysis of storage area network (SAN) access patterns. The SAN access patterns are illustratively determined at a storage access protocol level using statistics collected by a storage array or other type of storage system. The detected anomalies in some embodiments can include, for example, anomalies indicative of active cyber-attacks, such as an on-going ransomware attack, or other types of malicious activity targeting stored data of the storage array or other storage system.

In some embodiments, alarms or other types of alerts generated utilizing automated anomaly detection as disclosed herein are processed by at least one host driver, such as a multi-path input-output (MPIO) driver of the host device configured to provide or otherwise control various types of remediation responsive to the alerts. Other types of host drivers can be used in place of or in addition to one or more MPIO drivers. For example, in some embodiments, at least a portion of the disclosed remediation functionality is carried out using one or more iSCSI drivers, or other types of non-MPIO host drivers. Additional or alternative system components may also be used.

As indicated above, illustrative embodiments provide significant advantages over conventional practice. For example, these embodiments are configured to provide particularly accurate and efficient detection and remediation of on-going ransomware attacks or other types of malicious activity.

Implementing the detection and remediation based at least in part on protocol-level statistics collected by a storage array or other storage system is a particularly advantageous arrangement in that the storage array or other storage system is generally considered to be substantially less vulnerable to hacking than the host devices.

In one embodiment, an apparatus comprises at least one processing device that includes a processor and a memory, with the processor being coupled to the memory. The at least one processing device is configured to receive storage access protocol commands directed by one or more host devices to storage devices of a storage system over a SAN, to generate statistics relating to the received storage access protocol commands, to process the generated statistics in a machine learning system trained to recognize anomalous access patterns to the storage devices over the SAN, and to generate an alert indicative of an access anomaly based at least in part on the processing of the generated statistics in the machine learning system.

The storage access protocol commands in some embodiments comprise commands in a SCSI access protocol and/or commands in an NVMe access protocol. As more particular examples, the SCSI access protocol illustratively comprises a SCSI over Fibre Channel (SCSI-FC) access protocol and the NVMe access protocol illustratively comprises an NVMe over Fibre Channel (NVMeoFC) access protocol. A wide variety of other types of storage access protocols can be used in other embodiments, including, for example, Internet SCSI (iSCSI), NVMe over Fabrics (NVMeoF), NVMe/Transmission Control Protocol (TCP), and numerous others without limitation.

In some embodiments, generating statistics relating to the received storage access protocol commands comprises generating separate sets of statistics for respective ones of the storage devices.

For example, the sets of statistics generated for the respective ones of the storage devices each illustratively comprise one or more of number of read operations per second, number of write operations per second, average length of read operations, and average length of write operations. Additionally or alternatively, the sets of statistics generated for the respective ones of the storage devices each illustratively comprise, for example, number of management commands per second for the corresponding storage device, number of host devices communicating with the corresponding storage device, and/or identifiers of the host devices communicating with the corresponding storage device. Other types of statistics can be generated for each storage device in other embodiments.

In some embodiments, generating statistics relating to the received storage access protocol commands comprises generating, for each of the received storage access protocol commands, a per-command record comprising one or more of an identifier of the particular host device that directed the command, an identifier of the storage device to which the command was directed, a command type, command data transfer offset and data transfer length, and a timestamp associated with the command. The statistics in such embodiments are illustratively generated based at least in part on the per-command records generated for the respective received storage access protocol commands.

Additionally or alternatively, the protocol-level statistics in some embodiments are collected on a per-host basis. For example, the protocol-level statistics may be collected on both a per-device and a per-host basis.

Collecting the protocol-level statistics on both a per-device and a per-host basis advantageously allows the machine learning system to identify changes in the behavior of a certain host, such as the host starting to send read and/or write operations with unusual lengths, or at unusual rates, or targeting unusual devices, and so on. Furthermore, collection of the protocol-level statistics on a per-device and a per-host basis allows the machine learning system to detect situations in which one host is behaving differently than other hosts accessing the same storage device.

In some embodiments, processing the generated statistics in a machine learning system trained to recognize anomalous access patterns to the storage devices over the SAN comprises offloading the generated statistics from the storage system to at least one external server that implements the machine learning system, and processing the generated statistics in the machine learning system implemented by the at least one external server.

Additionally or alternatively, processing the generated statistics in a machine learning system trained to recognize anomalous access patterns to the storage devices over the SAN comprises processing the generated statistics utilizing at least one of a Gaussian mixture model (GMM) and a Holt-Winters model. A wide variety of other machine learning models and associated algorithms can be used in other embodiments.

The at least one processing device in some embodiments is further configured to initiate one or more remediation actions responsive to the alert.

For example, in some embodiments, the host device further comprises a multi-path layer comprising at least one MPIO driver configured to control delivery of IO operations from the host device to the storage devices of the storage system over selected ones of a plurality of paths through the SAN.

In such an embodiment, the at least one processing device is illustratively configured to provide the alert to the MPIO driver, and the MPIO driver is illustratively configured to initiate one or more remediation actions responsive to the alert. Other system components can initiate remediation actions responsive to alerts.

These and other illustrative embodiments include, without limitation, apparatus, systems, methods and computer program products comprising processor-readable storage media.

BRIEF DESCRIPTION OF THE DRAWINGS

FIG. 4 shows an example of protocol-level statistics maintained by a storage system for use in automated anomaly detection and remediation in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
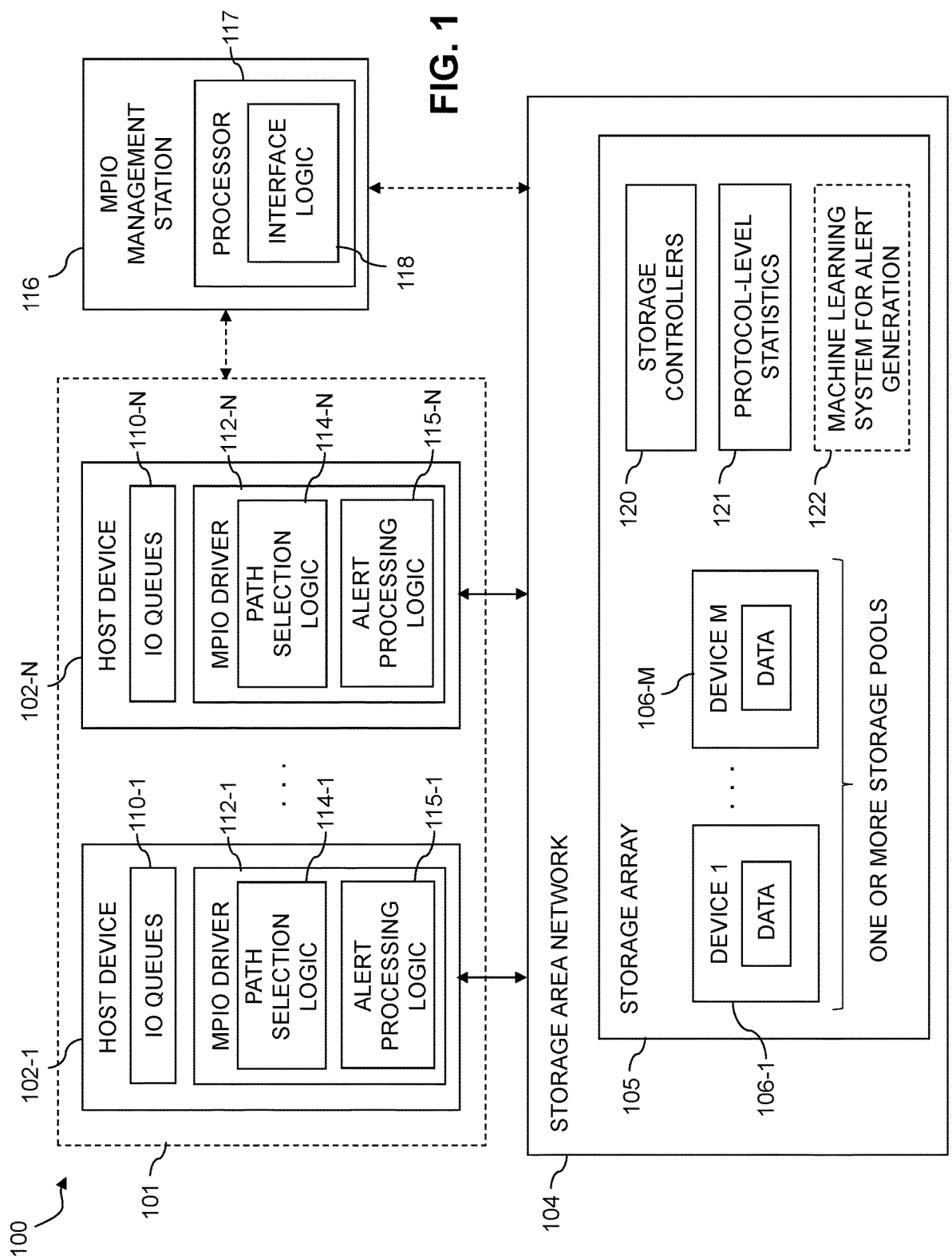
FIG. 1 is a block diagram of an information processing system configured with functionality for automated anomaly detection and remediation utilizing analysis of SAN access patterns in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or NVM Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for anomaly detection and remediation. Such functionality is provided at least in part using respective instances of alert processing logic 115-1, . . . 115-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for anomaly detection and remediation. Other types of MPIO drivers from other driver vendors may be suitably modified to incorporate functionality for anomaly detection and remediation as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the anomaly detection and remediation functionality disclosed herein, illustratively in cooperation with the storage array 105 and the instances of alert processing logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116. The MPIO management station 116 is illustratively connected directly to the storage array 105 using protocols such as SCSI, Internet SCSI (iSCSI), FC, NVMeoFC, NVMe over Fabrics (NVMeoF), NVMe/TCP, and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain alarms or other types of alerts from a machine learning system to facilitate anomaly detection and remediation for one or more host devices as disclosed herein.

In the FIG. 1 embodiment, the storage array 105 comprises a plurality of storage controllers 120, sets of protocol-level statistics 121, and optionally a machine learning system 122 for alert generation. The sets of protocol-level statistics 121 are illustratively maintained for respective ones of the storage device 106, which as noted above may comprise respective LUNs or other logical storage devices of the storage array 105. The machine learning system 122 is shown in dashed outline in this embodiment as it may in some implementations be located external to the storage array 105 rather than internal to the storage array 105. For example, the machine learning system 122 in some embodiments is implemented on one or more servers that are external to the storage array 105, such as in the MPIO management station 116 or in another type of external server. Accordingly, the machine learning system 122 may be located internal to the storage array 105, external to the storage array 105, or implemented in part internally and in part externally to the storage array 105. The term "machine learning system" as used herein is therefore intended to be broadly construed.

Communications between the host devices 102 and the storage array can utilize an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

The above-noted command in some embodiments comprises at least one predetermined vendor unique or VU command of a storage access protocol which the host device 102-1 utilizes to communicate with the storage array 105, such as a SCSI or NVMe protocol. A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of initiators.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The MPIO driver 112-1 is further configured to provide or otherwise control various types of remediation responsive to receipt of alarms or other types of alerts from the machine learning system 122 of the storage array 105.

As indicated previously, conventional approaches to anomaly detection are problematic, in that such techniques can take an unduly long amount of time to detect a ransomware attack or other type of cyber-attack in progress. For example, the longer it takes to detect the attack, the greater the number of files that are encrypted or otherwise compromised, and the greater the adverse impact of the attack on the victim.

Illustrative embodiments overcome these and other drawbacks of conventional practice by configuring the system 100 to include functionality for anomaly detection and remediation utilizing analysis of SAN access patterns, as will now be described in more detail.

In operation, the storage array 105 receives storage access protocol commands directed by the host devices 102 to the storage devices 106 over the SAN 104. As indicated previously, such storage access protocol commands can include, for example, at least one of commands in a SCSI access protocol and commands in an NVMe access protocol. As a more particular example, the storage access protocol commands illustratively include SCSI-FC commands and/or NVMeoFC commands, although additional or alternative storage access protocol command types can be used in other embodiments.

The storage controllers 120 of the storage array 105 are configured to control the generation of protocol-level statistics 121 relating to the received storage access protocol commands. The protocol-level statistics 121 are processed in a machine learning system 122 trained to recognize anomalous access patterns to the storage devices 106 over the SAN 104. At least one alarm or other type of alert indicative of an access anomaly is generated based at least in part on the processing of the protocol-level statistics 121 in the machine learning system 122. One or more remediation actions are illustratively taken in the system 100 responsive to the alert. In some embodiments, the alert is provided to alert processing logic 115 of one or more of the MPIO drivers 112 of host devices 102. The alert processing logic 115 can then initiate the one or more remediation actions responsive to the alert.

An example of a process including such operations will be described below in conjunction with the flow diagram of FIG. 2. These and other operations referred to herein as being performed by a storage array operating in conjunction with a host device can in other embodiments involve additional or alternative system components, such as one or more additional or alternative external servers not explicitly shown in system 100 of FIG. 1.

In some embodiments, generating protocol-level statistics 121 relating to the received storage access protocol commands comprises generating separate sets of statistics for respective ones of the storage devices 106. Thus, the protocol-level statistics 121 in such embodiments are generated on a per-device basis. An example of such an arrangement of protocol-level statistics will be described below in conjunction with FIG. 4.

The sets of protocol-level statistics generated for the respective ones of the storage devices 106 in some embodiments each illustratively comprise one or more of number of read operations per second, number of write operations per second, average length of read operations, and average length of write operations.

Additionally or alternatively, the sets of statistics generated for the respective ones of the storage devices 106 can each comprise, for example, number of management commands per second for the corresponding storage device, and/or number of host devices 102 communicating with the corresponding storage device.

In some embodiments, each of the sets of statistics additionally or alternatively includes identifiers of the host devices communicating with the corresponding storage device.

As a more particular example, generating protocol-level statistics 121 relating to the received storage access protocol commands comprises generating, for each of the received storage access protocol commands, a per-command record comprising one or more of an identifier of the particular host device that directed the command, an identifier of the storage device to which the command was directed, a command type, a command data transfer offset and data transfer length, and a timestamp associated with the command, such as a date and time of receipt of the command by the storage array 105. The protocol-level statistics 121 in such an arrangement are generated based at least in part on the per-command records generated for the respective received storage access protocol commands.

Additionally or alternatively, the protocol-level statistics 121 in some embodiments are collected on a per-host basis. For example, the protocol-level statistics 121 may be collected on both a per-device and a per-host basis.

Collecting the protocol-level statistics 121 on both a per-device and a per-host basis provides a number of significant advantages, such as, for example, allowing the machine learning system 122 to identify changes in the behavior of a certain host, such as the host starting to send read and/or write operations with unusual lengths, or at unusual rates, or targeting unusual devices, and so on.

Furthermore, collection of the protocol-level statistics on a per-device and a per-host basis allows the machine learning system 122 to detect situations in which one host is behaving differently than other hosts accessing the same storage device. For example, it may be the case that normally only one application at a time will access a given storage device if the access to the given storage device is from multiple hosts. In such a situation, the machine learning system 122 can generate an alert if one host has a different access pattern than other hosts accessing the same storage device.

Collecting the protocol-level statistics in the storage array 105 is particularly advantageous because the storage array 105 is generally considered to be substantially less vulnerable to hacking than the host devices 102. Such statistics typically cannot be collected from SAN switches, because such switches have FC context but not SCSI or NVMe command context. Collecting such statistics from the host devices 102 is problematic because it would require a large number of collection points, one for each of the N hosts, rather than a single centralized collection point in the storage array 105. Moreover, as indicated above, hosts are usually more vulnerable to hacks than storage arrays. The storage array 105 can therefore be considered relatively hack-resistant compared to the host devices 102.

The foregoing examples of protocol-level statistics 121 are presented for purposes of illustration, and should not be construed as limiting in any way.

In some embodiments, processing the generated statistics in the machine learning system 122, which is trained to recognize anomalous access patterns to the storage devices 106 over the SAN 104, comprises offloading the generated statistics from the storage array 105 to at least one external server that implements the machine learning system 122, and processing the generated statistics in the machine learning system 122 implemented by the at least one external server. By way of example, the MPIO management station 116 can comprise such an external server, although other types of external servers can be used.

The machine learning system 122 illustratively processes the generated statistics utilizing at least one of a Gaussian mixture model (GMM) and a Holt-Winters model, although a wide variety of different types of machine learning models and associated machine learning algorithms can be used, as will be appreciated by those skilled in the art.

An example of an algorithm performed at least in part by the storage array 105 using its protocol-level statistics 121 and machine learning system 122, in cooperation with the alert processing logic 115-1 of the MPIO driver 112-1 of a given one of the host devices 102-1, illustratively includes the following steps:

1. The storage array 105 records received storage access protocol level commands, such as SCSI or NVMe commands, directed to the storage devices 106, and maintains protocol-level statistics 121 on a per-device basis. Such statistics in the present example illustratively include reads/sec, writes/sec, average read length, average write length, management commands/sec, number of servers communicating with each device, etc. Other types of protocol-level statistics 121 can be used in other embodiments. The storage array 105 in maintaining the protocol-level statistics 121 on a per-device basis generates per-command records and derives the statistics from those records. For example, a given such record can include an identifier of the particular one of the host devices 102 that sent the command, the type of command, a starting logical address, an offset and a timestamp. The host device identifier can include, for example, at least one of a host name and a host number. Generation of such per-command records can involve the use of existing storage array tools utilized for performance monitoring. For example, a given such performance monitoring tool can output a list of commands received per storage device.

2. The storage array 105 provides the protocol-level statistics 121 periodically or under other specified conditions to the machine-learning system 122. As indicated above, the machine learning system 122 may be implemented within the storage array 105. In other embodiments, the protocol-level statistics 121 are offloaded on a periodic or other basis to an external server that implements the machine learning system 122. The latter approach has the advantage of ensuring that the computational and storage requirements of the machine learning system 122 do not undermine the performance of the storage array 105.

3. The machine learning system 122 implements one or more machine learning algorithms trained to recognize anomalous access patterns. Access patterns can include features such as command count patterns, data payload size patterns, time-of-day patterns, day-of-month patterns as well as combinations of these and/or other characteristics relating to the manner in which the storage devices 106 are accessed by the host devices 102 over time. The term "access pattern" as used herein is therefore intended to be broadly construed. By way of example, anomalous access patterns detectable by the machine learning system 122 may include one or more of the following, as well as numerous others:

(a) A read count that has grown exponentially for a certain storage device compared with same day-of-month statistics collected for the last three months.

(b) A storage device which normally receives 99% write commands for a certain time period such as a particular day-of-month and/or a particular range of time-of-day values but then starts receiving a large number of read commands in a subsequent instance of that same time period.

(c) A storage device that did not receive any commands for X days but then suddenly starts receiving a large number of commands.

The machine learning system can be trained to recognize these and a wide variety of other anomalous access patterns based on protocol-level statistics maintained by the storage array 105 on a per-device basis.

4. Responsive to detection of an access pattern anomaly by the machine learning system 122, one or more alarms or other types of alerts are generated in the system 100. For example, alerts can be generated by the machine learning system 122 and provided back to one or more instances of alert processing logic 115 of the MPIO drivers 112 in those of host devices 102 that sent storage access protocol commands to the impacted storage device or devices. In some embodiments, such interactions can occur at least in part via the MPIO management station 116, although other types of external servers can be used. Alternatively, in embodiments in which the machine learning system 122 is implemented internally to the storage array 105, the storage array 105 can provide the alert to the appropriate ones of the host devices 102 via in-band or out-of-band communications of the type described elsewhere herein.

5. Various types of remediation actions can be taken responsive to receipt of an alarm or other type of alert in an instance of the alert processing logic 115 of one of the MPIO drivers 112. For example, the MPIO driver can prevent further commands from being sent from the host device to the impacted storage device or devices, until such time as the detected access pattern anomaly is resolved. Numerous other types of remediation actions can be taken to block further data compromise as well as to identify the perpetrator.

The alerts can be provided to users such as system administrators with additional contextual information such as the corresponding anomalous statistics and other explanatory information characterizing the anomaly. Such users can also be provided with other related information from the storage array 105, such as an identifier of a particular database instance using the impacted storage device or devices, an identifier of a particular VM using the impacted storage device or devices, etc.

In some embodiments, anomalous access pattern alerts and other contextual or related information are automatically provided to a site management application, such as Ansible. Such a system can determine if site conditions exist that may explain the detected anomalous access pattern. For example, if a particular host device was just booted, and a database was just mounted utilizing a particular storage device or set of storage devices, the detected anomalous access pattern may not be a cyber-attack or other malicious activity, but may instead be attributable to the legitimate booting and mounting activity. This integration with a site management application in illustrative embodiments advantageously helps to reduce the number of false alarms that might otherwise occur in the system.

As noted above, illustrative embodiments provide significant advantages over conventional practice. For example, these embodiments can more easily and accurately detect an on-going cyber-attack or other type of malicious activity targeting storage devices of a storage array, thereby mitigating the adverse consequences of the malicious activity.

In some embodiments, alerts generated in the manner described above can be provided to an Intrusion Detection System (IDS) or a Security Information and Event Management (SIEM). For example, an IDS can be configured to detect other types of unauthorized activities at the infrastructure level, possibly via network inspection, and can be integrated with a system providing detection and remediation of access pattern anomalies as disclosed herein. An SIEM system illustratively provides real-time analysis of security alerts generated by applications and network hardware, and can similarly be integrated with a system providing detection and remediation of access pattern anomalies as disclosed herein.

Accordingly, the access pattern anomaly detection and remediation techniques disclosed herein can supplement existing protective measures deployed within an organization. Some embodiments herein can therefore be implemented at least in part in conjunction with an otherwise conventional IDS or SIEM.

Illustrative embodiments disclosed herein provide additional security in systems that use storage access protocols without built-in security, such as SCSI-FC, as well as in those systems in which users decide not to use available security protocols, such as CHAP in iSCSI systems and IP security protocols in Ethernet systems, due to the added complexity for key management and other related security functions.

These and other illustrative embodiments also overcome the deficiencies of existing FC switch management tools that monitor FC frames and therefore are unable to perform access pattern anomaly detection and remediation of the type disclosed herein. For example, such FC analyzers are generally unable to accurately monitor access patterns on a per-device basis because a storage device may have multiple FC addresses over the various communication paths. Moreover, FC analyzers used in existing FC switch management tools are very limited in their tracing capabilities, are expensive, complex to use and can concurrently monitor relatively few communication paths (e.g., 8-16 paths). Illustrative embodiments herein operate at an upper level protocol layer (e.g., SCSI-FC or NVMeoFC) in order to provide enhanced detection and remediation of access pattern anomalies.

Additional examples of anomaly detection and remediation arrangements will be described elsewhere herein in conjunction with the embodiments of FIGS. 2 through 4. Other types of anomaly detection and remediation arrangements can be used in other embodiments.

These and other functions related to anomaly detection and remediation that are referred to herein as being performed by or under the control of the storage array 105 and MPIO drivers 112 can in some embodiments be performed at least in part outside of the storage array 105 and MPIO drivers 112.

The above-described functions associated with anomaly detection and remediation in the MPIO driver 112-1 in some embodiments are carried out at least in part under the control of its alert processing logic 115-1, illustratively operating in cooperation with path selection logic 114-1. For example, the alert processing logic 115-1 is illustratively configured to control performance of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for anomaly detection and remediation.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support anomaly detection and remediation.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and alert processing logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
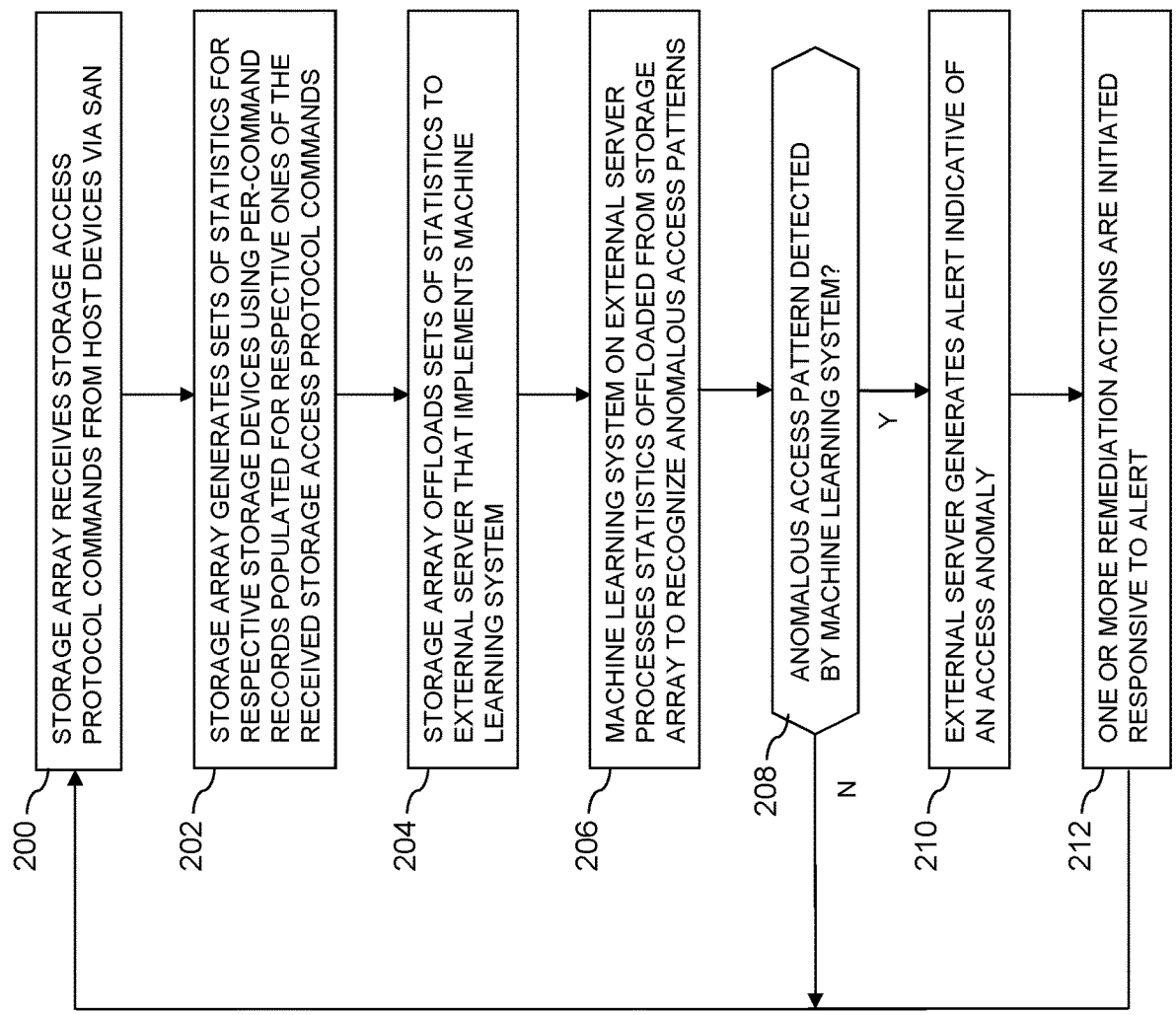
FIG. 2 is a flow diagram of a process for automated anomaly detection and remediation utilizing analysis of SAN access patterns in an illustrative embodiment.

The steps of the FIG. 2 process are illustratively performed at least in part by or under the control of a storage array, an MPIO driver of a given host device, and one or more additional components such as an external server implementing a machine learning system. Other arrangements of system components can be configured to perform at least portions of one or more of the steps in other embodiments.

In step 200, the storage array receives storage access protocol commands from multiple host devices via a SAN. For example, different host devices may each target the same storage device of the storage array with particular ones of their storage access protocol commands, such as SCSI commands or NVMe commands.

In step 202, the storage array generates sets of statistics for respective storage devices using per-command records populated for respective ones of the received storage access protocol commands.

In step 204, the storage array offloads sets of statistics to an external server that implements a machine learning system.

In step 206, the machine learning system on the external server processes the statistics offloaded from the storage array to recognize anomalous access patterns.

In step 208, a determination is made as to whether or not any anomalous access pattern has been detected by the machine learning system. If at least one anomalous access pattern has been detected by the machine learning system, the process moves to step 210, and otherwise returns to step 200 as indicated to continue its ongoing processing of storage access protocol commands received from the host devices via the SAN.

In step 210, the external server generates at least one alert indicative of an access anomaly corresponding to the detected anomalous access pattern.

In step 212, one or more remediation actions are initiated responsive to the alert. The process then returns to step 200 and continues its ongoing processing of storage access protocol commands received from the host devices via the SAN.

It is to be appreciated that the processing of received storage access protocol commands can be performed substantially continuously in the FIG. 2 process. For example, steps such as 200 and 202 are illustratively performed on an ongoing basis and not solely upon initial instances or returns from steps 208 and 212. Accordingly, the receiving of storage access protocol commands in step 200 and the generation of statistics using per-command records in step 202 can continue to be performed in the background while other steps of the process such as 204 through 212 are performed.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for anomaly detection and remediation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different anomaly detection and remediation arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
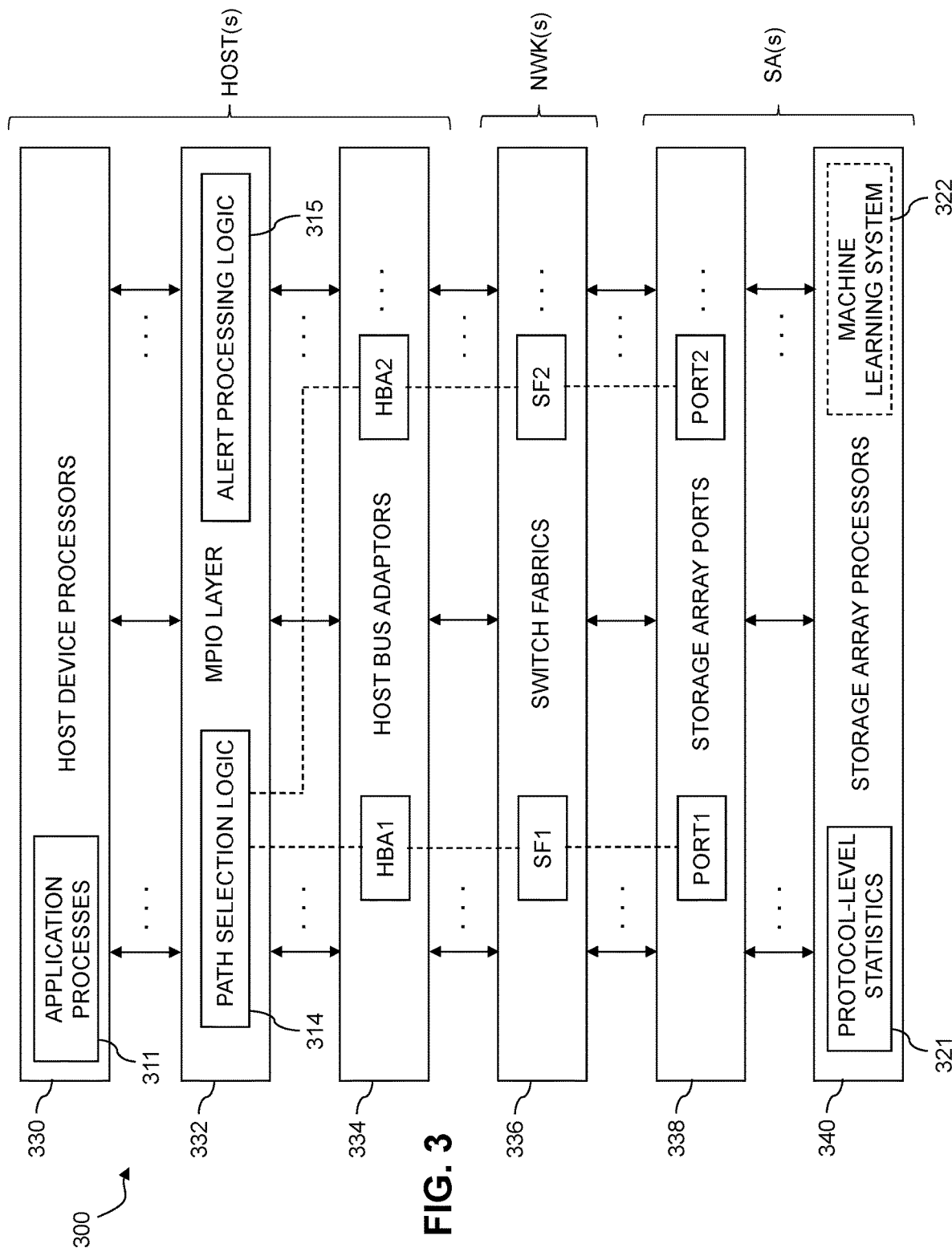
FIG. 3 is a block diagram showing multiple layers of a layered system architecture that incorporates functionality for automated anomaly detection and remediation utilizing analysis of SAN access patterns in an illustrative embodiment.

Referring now to FIG. 3, another illustrative embodiment is shown. In this embodiment, an information processing system 300 comprises host-side elements that include application processes 311, path selection logic 314 and alert processing logic 315, and storage-side elements that include protocol-level statistics 321 and a machine learning system 322. There may be separate instances of one or more such elements associated with each of a plurality of system components such as host devices and storage arrays of the system 300. In a manner similar to that described elsewhere herein, the protocol-level statistics 321 illustratively comprise different sets of protocol-level statistics maintained for respective ones of a plurality of storage devices of a storage array, such as storage devices 106 of storage array 105, based on SCSI, NVMe or other access protocol commands targeting those storage devices. Such protocol-level statistics are utilized by the machine learning system 322 to generate alerts indicative of anomalous access patterns, with such alerts being delivered to and processed by the alert processing logic 315 on the host side of the system 300. The machine learning system 322, like the machine learning system 122 of FIG. 1, is once again shown in dashed outline to indicate that it can alternatively be implemented using one or more servers that are external to the one or more storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements anomaly detection and remediation utilizing the protocol-level statistics 321 and machine learning system 322, as well as one or more MPIO drivers of the MPIO layer 332, and their associated instances of alert processing logic 315. The application processes 311 generate IO operations that are processed by the MPIO layer 332 for delivery to the one or more storage arrays. Paths are determined by the path selection logic 314 for sending such IO operations to the one or more storage arrays. These IO operations include IO operations for which protocol-level statistics 321 are collected by the storage array processor layer 340 for use in analysis of SAN access patterns in machine learning system 322 in conjunction with anomaly detection and remediation. The machine learning system 322 illustratively utilizes the protocol-level statistics 321 to generate one or more alarms or other types of alerts that are provided to alert processing logic 315 as part of the anomaly detection and remediation functionality of the system 300.

The MPIO layer 332 is an example of what is also referred to herein as a multi-path layer, and comprises one or more MPIO drivers implemented in respective host devices. Each such MPIO driver illustratively comprises respective instances of path selection logic 314 and alert processing logic 315 configured as previously described. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

It is assumed in this embodiment that the host devices through their respective MPIO drivers and respective instances of alert processing logic 315 provide functionality for anomaly detection and remediation, illustratively with involvement of other host device components such as the path selection logic 314.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example of the protocol-level statistics 321 maintained by one or more storage array processors of the storage array processor layer 340 of system 300 is shown. Such storage array processors may be viewed as corresponding to one or more storage controllers such as the storage controllers 120 of the storage array 105. The protocol-level statistics in this example more particularly comprise sets of protocol-level statistics maintained for respective storage devices denoted as Storage Device 1, Storage Device 2, . . . Storage Device M, which may be viewed as corresponding generally to respective ones of the storage devices 106 of the storage array 105. The protocol-level statistics 321 may therefore be viewed as an example of the protocol-level statistics 121 of storage array 105.

The protocol-level statistics 321 in this embodiment are derived from per-command records, with such records being generated from commands that target the corresponding storage devices. The protocol-level statistics 321 are illustratively utilized by the machine learning system 322 to generate alerts that are processed by the alert processing logic 315 of the MPIO layer 332 of system 300.

The particular arrangement of protocol-level statistics shown in FIG. 4 is only an example, and numerous other types and arrangements of protocol-level statistics can be maintained by a storage system in other embodiments.

The above-described processes, algorithms and other features and functionality disclosed herein are presented by way of illustrative example only, and other embodiments can utilize additional or alternative arrangements.

Also, as mentioned previously, different instances of the above-described processes, algorithms and other anomaly detection and remediation techniques can be performed using different system components. For example, a machine learning system can be implemented using one or more servers that are external to a storage array 105 or other type of storage system. Also, alert processing logic can be implemented using other types of host drivers, such as, for example, iSCSI drivers, or more generally other host device components.

The particular anomaly detection and remediation arrangements described above are therefore presented by way of illustrative example only. Numerous alternative arrangements of these and other features can be used in implementing the anomaly detection and remediation in other illustrative embodiments.

The illustrative embodiments disclosed herein can provide a number of significant advantages relative to conventional arrangements.

For example, some embodiments are advantageously configured to provide particularly accurate and efficient detection and remediation of on-going ransomware attacks or other types of malicious activity, utilizing protocol-level statistics obtained by a storage array or other type of storage system.

These and other embodiments can significantly reduce the amount of time required to detect an on-going ransomware attack or other type of cyber-attack, thereby substantially reducing the number of files that are encrypted or otherwise compromised by the attack, and alleviating the adverse impact of the attack on the victim.

Implementing detection and remediation is based at least in part on protocol-level statistics collected by a storage array or other storage system is particularly advantageous arrangement in that the storage array or other storage system is generally considered to be substantially less vulnerable to hacking than the host devices.

A given storage system in an illustrative embodiment can therefore provide effective detection of a cyber-attack or other malicious activity while also providing an automated path to full remediation.

Also, some embodiments can be integrated with an IDS or an SIEM system of an enterprise or other organization in order to provide enhanced security in these and numerous other information processing system contexts.

Illustrative embodiments disclosed herein also overcome the deficiencies of existing FC switch management tools that monitor FC frames and therefore are unable to perform access pattern anomaly detection and remediation of the type disclosed herein.

Some embodiments advantageously operate at an upper level protocol layer (e.g., SCSI-FC or NVMeoFC) in order to provide enhanced detection and remediation of access pattern anomalies.

Functionality for anomaly detection and remediation utilizing analysis of SAN access patterns as disclosed herein can be implemented in a storage system, in a host device, or partially in a storage system and partially in a host device, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and alert processing logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, alert processing logic and additional or alternative components. Also, the particular configurations of system and device elements and associated processing operations illustratively shown in the drawings can be varied in other embodiments. For example, a wide variety of different host device configurations and associated anomaly detection and remediation arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:
1. An apparatus comprising:
at least one processing device comprising a processor coupled to a memory;
where the at least one processing device is configured:
to receive storage access protocol commands directed by one or more host devices to storage devices of a storage system over a storage area network;
to generate statistics relating to the received storage access protocol commands;
to process the generated statistics in a machine learning system trained to recognize anomalous access patterns to the storage devices over the storage area network; and
to generate an alert indicative of an access anomaly based at least in part on the processing of the generated statistics in the machine learning system;
wherein the statistics are generated in the storage system based at least in part on per-command records maintained by the storage system for respective ones of the received storage access protocol commands;
a given one of the per-command records for a corresponding one of the received storage access protocol commands comprising at least an identifier of a particular one of the storage devices to which the corresponding received storage access protocol command is directed, a data transfer offset of the corresponding received storage access protocol command and a data transfer length of the corresponding received storage access protocol command;
wherein the one or more host devices further comprise a multi-path layer comprising at least one multi-path input-output driver configured to control delivery of input-output operations to the storage devices of the storage system over selected ones of a plurality of paths through the storage area network, and wherein the at least one processing device is further configured to provide the alert to the multi-path input-output driver.

2. The apparatus of claim 1 wherein the storage access protocol commands comprise at least one of commands in a Small Computer System Interface (SCSI) access protocol and commands in a Non-Volatile Memory Express (NVMe) access protocol.

3. The apparatus of claim 2 wherein the SCSI access protocol comprises at least one of a SCSI over Fibre Channel (SCSI-FC) access protocol and an Internet SCSI (iSCSI) access protocol, and the NVMe access protocol comprises at least one of an NVMe over Fibre Channel (NVMeoFC) access protocol, an NVMe over Fabrics (NVMeoF) access protocol, and an NVMe/Transmission Control Protocol (TCP) access protocol.

4. The apparatus of claim 1 wherein generating statistics relating to the received storage access protocol commands comprises generating separate sets of statistics for respective ones of the storage devices.

5. The apparatus of claim 4 wherein the sets of statistics generated for the respective ones of the storage devices each comprise one or more of:
number of read operations per second;
number of write operations per second;
average length of read operations; and
average length of write operations.

6. The apparatus of claim 4 wherein the sets of statistics generated for the respective ones of the storage devices each comprise number of management commands per second for the corresponding storage device.

7. The apparatus of claim 4 wherein the sets of statistics generated for the respective ones of the storage devices each comprise number of host devices communicating with the corresponding storage device.

8. The apparatus of claim 7 wherein each of the sets of statistics further includes identifiers of the host devices communicating with the corresponding storage device.

9. The apparatus of claim 1 wherein generating statistics relating to the received storage access protocol commands comprises generating, for each of the received storage access protocol commands, a per-command record comprising, in addition to the identifier of the storage device to which the command was directed, the data transfer offset and the data transfer length, one or more of:
an identifier of the particular host device that directed the command;
a command type; and
a timestamp associated with the command.

10. The apparatus of claim 1 wherein processing the generated statistics in a machine learning system trained to recognize anomalous access patterns to the storage devices over the storage area network comprises:
offloading the generated statistics from the storage system to at least one external server that implements the machine learning system; and
processing the generated statistics in the machine learning system implemented by the at least one external server.

11. The apparatus of claim 1 wherein processing the generated statistics in a machine learning system trained to recognize anomalous access patterns to the storage devices over the storage area network comprises processing the generated statistics utilizing at least one of a Gaussian mixture model (GMM) and a Holt-Winters model.

12. The apparatus of claim 1 wherein the at least one processing device is further configured to initiate one or more remediation actions responsive to the alert.

13. The apparatus of claim 1 wherein the multi-path input-output driver is configured to initiate one or more remediation actions responsive to the alert.

14. A computer program product comprising a non-transitory processor-readable storage medium having stored therein program code of one or more software programs, wherein the program code, when executed by at least one processing device comprising a processor coupled to a memory, causes the at least one processing device:
to receive storage access protocol commands directed by one or more host devices to storage devices of a storage system over a storage area network;
to generate statistics relating to the received storage access protocol commands;
to process the generated statistics in a machine learning system trained to recognize anomalous access patterns to the storage devices over the storage area network; and
to generate an alert indicative of an access anomaly based at least in part on the processing of the generated statistics in the machine learning system;
wherein the statistics are generated in the storage system based at least in part on per-command records maintained by the storage system for respective ones of the received storage access protocol commands;
a given one of the per-command records for a corresponding one of the received storage access protocol commands comprising at least an identifier of a particular one of the storage devices to which the corresponding received storage access protocol command is directed, a data transfer offset of the corresponding received storage access protocol command and a data transfer length of the corresponding received storage access protocol command;
wherein the one or more host devices further comprise a multi-path layer comprising at least one multi-path input-output driver configured to control delivery of input-output operations to the storage devices of the storage system over selected ones of a plurality of paths through the storage area network, and wherein the at least one processing device is further configured to provide the alert to the multi-path input-output driver.

15. The computer program product of claim 14 wherein generating statistics relating to the received storage access protocol commands comprises generating separate sets of statistics for respective ones of the storage devices.

16. A method comprising:
receiving storage access protocol commands directed by one or more host devices to storage devices of a storage system over a storage area network;
generating statistics relating to the received storage access protocol commands;
processing the generated statistics in a machine learning system trained to recognize anomalous access patterns to the storage devices over the storage area network; and
generating an alert indicative of an access anomaly based at least in part on the processing of the generated statistics in the machine learning system;
wherein the statistics are generated in the storage system based at least in part on per-command records maintained by the storage system for respective ones of the received storage access protocol commands;
a given one of the per-command records for a corresponding one of the received storage access protocol commands comprising at least an identifier of a particular one of the storage devices to which the corresponding received storage access protocol command is directed, a data transfer offset of the corresponding received storage access protocol command and a data transfer length of the corresponding received storage access protocol command;
wherein the one or more host devices further comprise a multi-path layer comprising at least one multi-path input-output driver configured to control delivery of input-output operations to the storage devices of the storage system over selected ones of a plurality of paths through the storage area network, and wherein at least one processing device is configured to provide the alert to the multi-path input-output driver; and
wherein the method is performed by the at least one processing device, the at least one processing device comprising a processor coupled to a memory.

17. The method of claim 16 wherein generating statistics relating to the received storage access protocol commands comprises generating separate sets of statistics for respective ones of the storage devices.

* * * * *